United States Patent
Tamura

(10) Patent No.: US 7,536,499 B2
(45) Date of Patent: May 19, 2009

(54) MEMORY ACCESS CONTROL DEVICE AND PROCESSING SYSTEM HAVING SAME

(75) Inventor: Ikuhiro Tamura, Kanagawa (JP)

(73) Assignee: Sony Corporation (JP)

( * ) Notice: Subject to any disclaimer, the term of this patent is extended or adjusted under 35 U.S.C. 154(b) by 90 days.

(21) Appl. No.: 10/557,096

(22) PCT Filed: May 21, 2004

(86) PCT No.: PCT/JP2004/007291

§ 371 (c)(1),
(2), (4) Date: Jul. 25, 2006

(87) PCT Pub. No.: WO2004/109519

PCT Pub. Date: Dec. 16, 2004

(65) Prior Publication Data

US 2007/0055810 A1    Mar. 8, 2007

(30) Foreign Application Priority Data

May 22, 2003   (JP) ............................. 2003-144552

(51) Int. Cl.
 G06F 12/00 (2006.01)
(52) U.S. Cl. ..................... 711/5; 711/131; 711/149; 345/554; 365/230.05
(58) Field of Classification Search .............. 711/131, 711/5, 149; 345/554; 365/230.05
See application file for complete search history.

(56) References Cited

U.S. PATENT DOCUMENTS

| | | | |
|---|---|---|---|
| 4,413,315 A | 11/1983 | Kurakake | |
| 4,660,141 A | 4/1987 | Ceccon et al. | |
| 5,696,913 A | 12/1997 | Gove et al. | |
| 6,334,175 B1 | 12/2001 | Chih et al. | |
| 6,453,409 B1 | 9/2002 | Nakamura | |
| 2004/0120208 A1* | 6/2004 | Carter | ................... 365/230.05 |

FOREIGN PATENT DOCUMENTS

| | | |
|---|---|---|
| JP | 55-105763 A | 8/1980 |
| JP | 60-037055 A | 2/1985 |
| JP | 04-255064 A | 9/1992 |

(Continued)

OTHER PUBLICATIONS

Supplementary European Search Report, EP 04 73 4370.

*Primary Examiner*—Hyung S Sough
*Assistant Examiner*—Mardochee Chery
(74) *Attorney, Agent, or Firm*—Lerner, David, Littenberg, Krumholz & Mentlik, LLP

(57) ABSTRACT

A memory access control device enabling freer access from a plurality of ports to a plurality of memories and a processing system having the same are provided. From among addresses generated at a read address generation unit and addresses input from an external bus, the address which is supplied to a local memory (LM) is selected in accordance with configuration information supplied by a configuration information storage unit. Addresses correspond to ports. Lower bits thereof instruct the storage region inside the LM, and upper bits instruct the LM to be accessed. The read data to be output to a port is selected from among the read data of a plurality of LMs in accordance with the upper bits of this address.

5 Claims, 12 Drawing Sheets

FOREIGN PATENT DOCUMENTS

| | | |
|---|---|---|
| JP | 05-290080 A | 11/1993 |
| JP | 10-187599 A | 7/1998 |
| JP | 10-260952 A | 9/1998 |
| JP | 2002-215382 A | 8/2002 |
| WO | 01/74134 | 10/2001 |

* cited by examiner

MEMORY ACCESS CONTROL DEVICE AND PROCESSING SYSTEM HAVING SAME

CROSS-REFERENCE TO RELATED APPLICATIONS

The present application is a national stage application under 35 U.S.C. 371 of International Application No. PCT/JP2004/007291, filed May 21, 2004, which claims priority from Japanese Application No. P2003-144552, filed May 22, 2003, the disclosures of which are hereby incorporated by reference herein.

BACKGROUND OF THE INVENTION

1. Technical Field

The present invention relates to a memory access control device for controlling access to a memory, more particularly relates to a memory access control device for controlling access to a memory from a plurality of ports and a processing system having the same.

2. Background Art

For example, like a processing system disclosed in Japanese Patent Publication (A) No. 2002-215382, there is known a device referred to as "dynamically reconfigurable hardware" able to change the configuration of a circuit during its operation.

Dynamically reconfigurable hardware is generally connected to a system bus together with a CPU, system memory, etc. and performs processing in cooperation with the CPU. In the process of the processing, when data for defining the circuit configuration, referred to as configuration information (CS), is written into a specific register of the dynamically reconfigurable hardware, the circuit is dynamically reconfigured based on the written configuration information. The dynamically reconfigurable hardware is generally provided inside it with a local memory for storing the data to be processed. When processing is performed in dynamically reconfigurable hardware, the data to be processed is transferred once from the system memory via the system bus to the local memory (LM), processed there, then written back to the system memory again and utilized at the CPU etc.

FIG. 11 is a block diagram of an example of the configuration of general dynamically reconfigurable hardware. The dynamically reconfigurable hardware has write address generators (abbreviated as AGWs) 1-0 to 1-3, read address generators (abbreviated as AGRs) 2-0 to 2-3, LMs 3-0 to 3-3, processor units (PUs) 4-0 to 4-3, and a configuration information register (CS-REG) 5.

An AGW 1-n (n indicates an integer of 0 to 3) generates the destination address when writing data of the result of processing in a PU 4-n into an LM 3-n. An AGR 2-n generates the destination address when reading the data to be stored in the TM 3-n and outputting it to the PU 4-n. The address generation operations in the AGW 1-n and the AGR 2-n are determined based on the configuration information CS supplied from the CS-REG5. The LM 3-n stores the data to be processed of the PU 4-n and the data of the result of the processing. The PU 4-n performs predetermined processing for the data stored in the LM 3-n and stores the processing result in the LM 3-n again. The PU 4-n is reconfigured based on the configuration information CS supplied from the CE-REG5 and changes the content of the processing operation as the result of the reconfiguration. The CS-REG 5 stores the configuration information CS written via the system bus and supplies the stored configuration information CS to the AGW 1-n, AGR 2-n, and PU 4-n.

According to the dynamically reconfigurable hardware shown in FIG. 11, the content of the operation generating the addresses in the AGW 1-n and the AGR 2-n and the content of the processing operation in the PU 4-n can be dynamically changed in accordance with the configuration information CS written into the CS-REG 5 via the system bus.

When the processing is carried out in the PUs (4-0 to 4-3), the data to be processed is transferred to the LMs (3-0 to 3-3) determined for each PU via the system bus. The data transferred to the LMs (3-0 to 3-3) are read by the corresponding PUs (4-0 to 4-3) and subjected to predetermined processing in accordance with the configuration information CS. The data of the processing results are written into the corresponding LMs (3-0 to 3-3) and written back to the not shown system memory via the system bus.

In the dynamically reconfigurable hardware shown in FIG. 11, local memories (IMs), address generators (AGW, AGR), and processor units (PUs) are provided in one-to-one correspondence. For example, addresses generated in the AGW 1-0 and AGR 2-0 are limited to addresses for accessing the LM 3-0 and cannot be utilized for access to the other LMs. In the same way, the destination of the data read out from the LM 3-0 is limited to the PU 4-0, and the destination of the processing result output from the PU 4-0 is limited to the TM 3-0. In this way, in dynamically reconfigurable hardware provided with a plurality of PUs and a plurality of LMs, there are restrictions in the access of the PUs with respect to the IMs, therefore there are the various disadvantages mentioned below.

For example, processing operations involving transfer of data among PUs, for example, the use of processing result of the PU 4-0 in the PU 4-1, cannot be executed inside the dynamically reconfigurable hardware.

Since assignment of storage regions with respect to PUs is limited, for example, when the processing operations are stopped in part of the PUs, the LMs corresponding to the stopped PUs are not utilized at all and become wasted.

In the dynamically reconfigurable hardware shown in FIG. 11, while a PU is accessing an LM, processing for writing the data to be processed of the dynamically reconfigurable hardware from the system bus to the LM and processing for reading the processing result from the LM and outputting the same to the system bus cannot be executed.

Accordingly, in order to access the LM from the system bus, as shown in FIG. 12, it is necessary to switch (change) the supplying side of the address to the LM from the internal address generator to the external address bus BA#ex in the state where the PU is stopped and, at the same time, switch an input/output port of the LM from the internal PU to the external data bus BD#ex.

In this way, the PU must be stopped in order to access the LM inside the dynamically reconfigurable hardware from an external bus, therefore there is the disadvantage of occurrence of delay due to the stopping of the processing.

Therefore, for example as shown in FIG. 13, the method of overcoming the above disadvantage by replacing the above plurality of independent LMs by single multi-port memory can be considered. By using a multi-port memory, it becomes possible to simultaneously access the address space of the entire memory from a plurality of input/output ports, therefore a processing operation involving the transfer of data among PUs becomes possible and, at the same time, the degree of freedom of the assignment of storage regions with respect to the PUs can be raised. However, in general, when realizing a multi-port memory as a semiconductor integrated circuit, the area becomes very large, therefore, when using this, the disadvantage is encountered of inviting soaring costs.

SUMMARY OF THE INVENTION

An object of the present invention is to provide a memory access control device making it possible to more freely access a plurality of memories from a plurality of ports by a simple configuration.

Further, another object of the present invention is to provide a processing system making it possible to more freely access a plurality of memories from a plurality of reconfigurable processor units by a simple configuration by providing such a memory access control device.

According to a first aspect of the present invention, there is provided a memory access control device for controlling access from a plurality of ports to a plurality of memories, including an address selection unit selecting an address from among a plurality of addresses, the address which is supplied to the first memory to be accessed, and is selected as an address instructing both the first memory and a storage region of the first memory, in accordance with first information which links the memories and the ports, and the plurality of addresses which are inputted corresponding to the plurality of ports; and a read data selection unit selecting one read data from among a plurality of read data which are read from the plurality of memories in response to the supply of the address, the one read data which is outputted to a destination port in accordance with the address corresponding to the destination port.

In the memory access control device, the memory to be accessed from a port is instructed by the address input corresponding to the port. The linkage between the memories and the ports is set in the first information. The address selection unit selects an address to be supplied to a memory in accordance with the linkage between the memories and the ports in the first information from among a plurality of addresses input corresponding to a plurality of ports. Due to this, the memory is supplied with for example an address input corresponding to a port linked with in the first information. Further, the read data selection unit selects read data to be output to a port from among the read data read from a plurality of memories in response to the supply of the address. The read data is selected in accordance with the address input corresponding to the destination port. For example, the read data from the memory instructed to be accessed in that address is selected.

Preferably, the memory access control device may further include a write data selection unit for selecting a write data to be supplied to the first memory from among a plurality of write data input from the port in accordance with the first information and a write control signal generation unit for generating a write control signal for permitting or prohibiting data writing at the memory of the address destination in accordance with whether or not the address selected at the address selection unit is an address instructing the memory of the address destination to be accessed.

According to this configuration, the write data selection unit selects as the write data to be supplied to the memory the data in accordance with the first information from among the write data input from a plurality of ports. Accordingly, the input port of the write data to be supplied to the memory is set in accordance with the linkage between the memories and the ports in the first information. The write control signal generation unit generates a write control signal for permitting or prohibiting data writing at the memory of the address destination in accordance with whether or not the address selected at the address selection unit is an address instructing the memory of the address destination to be accessed. Accordingly, whether or not to permit data writing at the memory is determined in accordance with whether or not the memory is instructed to be accessed in the address supplied to the memory.

Further preferably, when a second memory to be made able to use an address which another memory different from the first memory can read among the plurality of memories as the address which it can itself read is designated in the input second information, the read data selection unit outputs the read data of the second memory designated in the second information to a specific port predetermined with respect to the designated second memory.

According to this operation, the read data selection unit outputs the read data of the memory designated in the second information to the specific reading port predetermined with respect to the designated memory. Accordingly, when an address is supplied to the designated memory, even when the supplied address is an address for accessing another memory, it is used as an address for accessing the designated memory, and the data in accordance with the address is read out from the designated memory. Then, the read data is output to the specific reading port predetermined with respect to the designated memory.

Further preferably, when a third memory to be made able to use an address to which another memory among the plurality of memories can write as the address to which it can itself write is designated in the input second information, the write data selection unit supplies the write data input from the specific writing port predetermined with respect to the third memory designated in the second information to the designated third memory, and the write control signal generation unit generates the write control signal for permitting the data writing in the designated third memory.

According to this operation, the write data selection unit selects the write data input from a specific writing port predetermined with respect to-a memory designated as the write data to be supplied to the memory designated in the second information. Accordingly, the designated memory is supplied with data input from the specific writing port predetermined with respect to the designated memory as the write data. The write control signal generation unit generates a write control signal for permitting data writing in the designated memory. Accordingly, in the designated memory, even when the supplied address is an address for accessing another memory, data writing is permitted by the write control signal.

Preferably, when a fourth memory to be made able to use an address to which another memory can write among the plurality of memories as an address to which it can write itself is designated in the second information and, at the same time, the port to input the write data to the designated fourth memory is designated, the address selection unit selects the address input corresponding to the port designated in the second information and supplies it to the fourth memory designated in the second information, and the write data selection unit selects the write data input from the designated port and supplies it to the designated fourth memory.

According to this operation, the address selection unit selects as write data to be supplied to the designated memory an address input corresponding to a port designated in the second information. The write data selection unit selects as the write data to be supplied to the designated memory the data input from the port designated in the second information. For example, when there are a plurality of memories designated in the second information and a common port is designated as the ports to input the write data to these memories, the write data input from this common port are simultaneously written into the designated plurality of memories in accordance with the input of the address corresponding to the common port.

According to a second aspect of the present invention, there is provided a processing system reconfigurable in components of the processing system, including a plurality of memories accessed via a plurality of ports, a processing execution unit reconfiguring the components of the processing system based on the configuration information configuring the components of the processing system and performing predetermined processing on read data of at least one memory among the plurality of memories output from a predetermined port, and a memory access control device for controlling access to the plurality of memories from the plurality of ports based on the configuration information.

The memory access control device is substantially the same as the memory access control device of the first aspect of the present invention mentioned above.

In the processing system, the processing execution unit is reconfigured based on the configuration information. Further, it carries out predetermined processing on the read data of the memory output from a predetermined port. The memory to be accessed by the processing execution unit is instructed in the address input corresponding to a plurality of ports. The linkage between the memories and the ports is set in the first information of the configuration information. The address selection unit selects the address to be supplied to the memory in accordance with the linkage between the memories and the ports in the first information from among a plurality of addresses input corresponding to a plurality of ports. Due to this, the memory is supplied with for example an address input corresponding to the port linked with in the first information. The read data selection unit selects the read data to be output to the port from among the read data read out from the plurality of memories in response to the supply of the address. The read data is selected in accordance with the address input corresponding to the destination port. For example, the read data from the memory instructed to be accessed in that address is selected.

Preferably, the processing execution unit inputs the processing results as the write data of the memory to the predetermined port, and the memory access control device has a write data selection unit for selecting the write data to be supplied to the memory from among a plurality of write data input from the port in accordance with the first information and a write control signal generation unit for generating a write control signal for permitting or prohibiting data writing in the memory of the address destination in accordance with whether or not the address selected in the address selection unit is an address instructing the memory of the address destination to be accessed.

According to the configuration of the processing system, the write data selection unit selects as the write data to be supplied to the memory the data in accordance with the first information from among the write data input from a plurality of ports. Accordingly, the input port of the write data to be supplied to the memory is set in accordance with the linkage between the memories and the ports in the first information. The write control signal generation unit generates a write control signal for permitting or prohibiting data writing in the memory of the address destination in accordance with whether or not the address selected in the address selection unit is an address instructing the memory of the address destination to be accessed. Accordingly, whether or not data writing is permitted in the memory is determined in accordance with whether or not the memory is instructed to be accessed in the address supplied to the memory.

DETAILED DESCRIPTION

BEST MODE FOR WORKING THE INVENTION

The above objects and features of the present invention and other objects and features will become clearer from the following description given with reference to the accompanying drawings.

Figure 1:
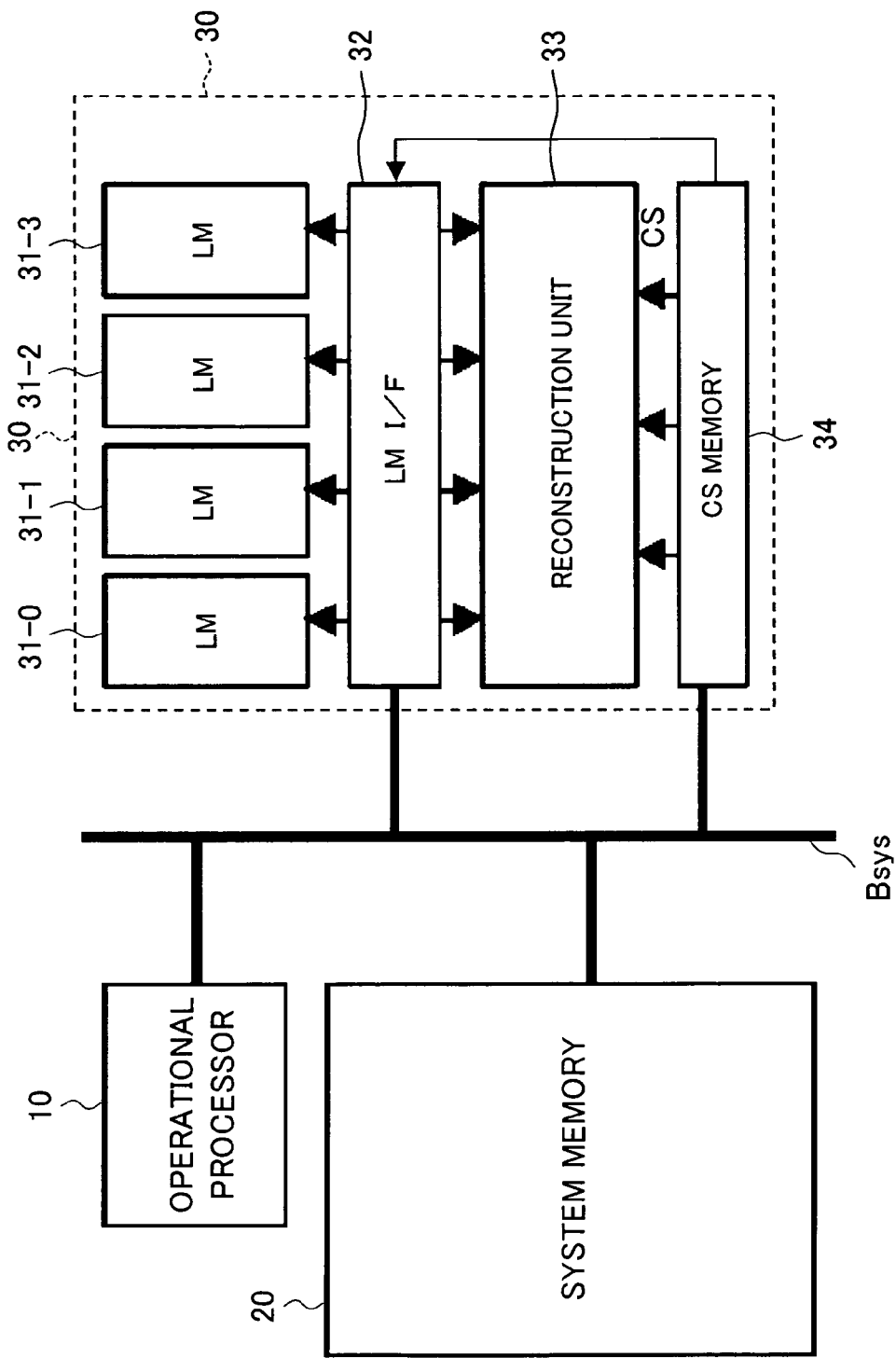
FIG. 1 is a block diagram of an example of the configuration of a processing system according to an embodiment of the present invention.

FIG. 1 is a block diagram showing an example of the configuration of a processing system according to an embodiment of the present invention. The processing system shown in FIG. 1 has a processing unit 10, a system memory 20, and reconfigurable hardware 30.

The processing unit 10 executes predetermined processing based on a program stored in a not shown storage unit. In the process of the processing, for example the system memory 20 is accessed via a system bus Bsys, and the predetermined processing in accordance with the program is applied to the stored data. Further, the processing unit 10 executes processing for accessing the reconfigurable hardware 30 via the system bus Bsys, supplying the configuration information to this, and setting its internal state, processing for supplying the data to be processed to the reconfigurable hardware 30 from the system memory 20, and processing for writing back the processing results from the reconfigurable hardware 30 to the system memory 20.

The system memory 20 stores the data used for the processing and the processing results thereof in the processing unit 10 and the reconfigurable hardware 30. The system memory 20 is connected to the processing unit 10 and the reconfigurable hardware 30 via the system bus Bsys. The stored data thereof is transferred via the system bus Bsys.

The reconfigurable hardware,30 reconfigures its internal circuit in accordance with the configuration information supplied from the CPU 10. For example, it can dynamically reconfigure the internal circuit in accordance with the configuration information supplied during the operation of the circuit.

Further, the reconfigurable hardware 30 is set in a state where access from the system bus Bsys with respect to the local memory (LM) equipped in its inside in accordance with the supplied configuration information is possible. In this state, when the data is output from the system memory 20 to the system bus Bsys under the control of the processing unit 10, this is once stored in the internal LM.

The reconfigurable hardware 30 applies to the data stored in the LM predetermined processing in accordance with the circuit configuration set according to the configuration information and writes back the processing result thereof to the LM. The processing result stored in the LM is output to the system bus Bsys in response to the read access from the processing unit 10 and written back to the system memory 20.

In the example of the configuration of FIG. 1, the reconfigurable hardware 30 has local memories (LMs) 31-0 to 31-3 as an embodiment of the plurality of memories in the present invention, a local memory interface unit (LM-I/F) 32, a reconfiguration unit (RU) 33, and a configuration information memory (CS-MEM) 34.

The LMs 31-0 to 31-3 store the data supplied from the reconfiguration unit 33 and the system bus Bsys via the LM-I/F 32 and, at the same time, output the stored data via the LM-I/F 32 to the reconfiguration unit 33 and the system bus Bsys.

As each of the LMs 31-0 to 31-3, for example, a single port memory in which the port for the read data and the port for the write data are common may be used or a dual port memory providing a port for the read data and a port for the write data and able to simultaneously execute reading and writing may be used.

The LM-I/F 32 controls the access with respect to the LMs 31-0 to 31-3 from the reconfiguration unit 33 and the system bus Bsys based on the configuration information CS supplied from the CS-MEM 34.

The reconfiguration unit (RU) 33 reconfigures the internal circuit based on the configuration information CS supplied from the CS-MEM 34. The RU 33 has a plurality of processing execution units (PU: processor units) for performing the processing operation in accordance with the configuration information CS as will be mentioned later. These processor units (PU) access the LMs 31-0 to 31-3 via the LM-I/F 32. Namely, a plurality of PUs read out the data to be processed from these LMs, apply the predetermined processing in accordance with the circuit configuration set by the configuration information CS, and write back the processing results to these LMs.

The CS-MEM 34 stores the configuration information CS transferred from the system memory 20 or a not shown other storage unit via the system bus Bsys. Further, it supplies the stored configuration information CS to the LM-I/F 32 and the reconfiguration unit (RU) 33.

An example of a further detailed configuration of the above reconfigurable hardware 30 will be explained by referring to FIG. 2 and FIG. 3.

Figure 2:
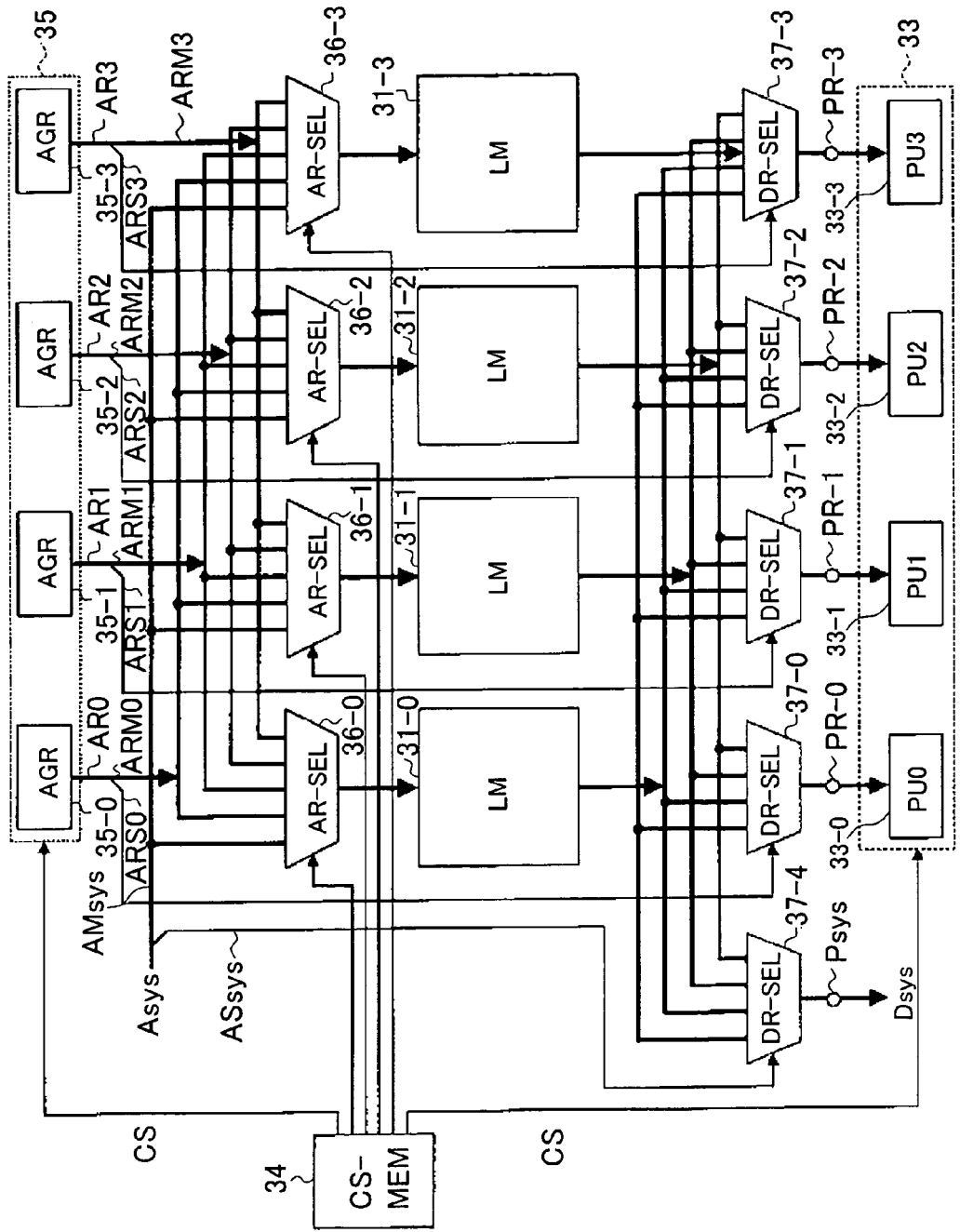
FIG. 2 is a block diagram showing extracted a portion relating to read access from an LM from the example of configuration of reconfigurable hardware shown in FIG. 1.
Figure 3:
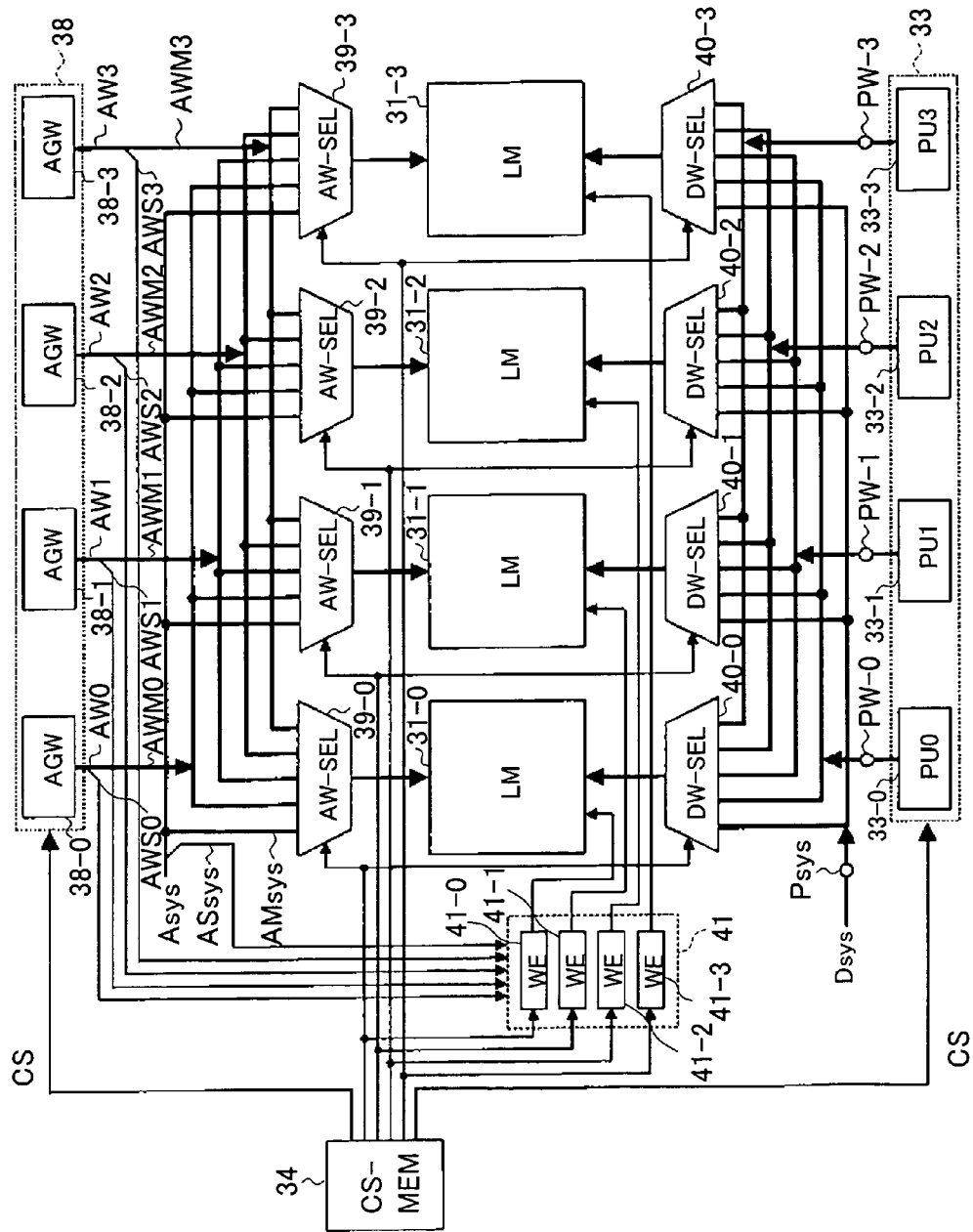
FIG. 3 is a block diagram showing extracted a portion relating to write access to an LM in the present embodiment.

FIG. 2 and FIG. 3 are block diagrams showing an example of the configuration of the reconfigurable hardware 30. FIG. 2 is a diagram showing extracted a portion relating to read access from a local memory (LM), and FIG. 3 is a diagram showing a portion relating to write access to the LM. The same notations in FIG. 1 to FIG. 3 indicate the same components.

As shown in FIG. 2 and FIG. 3, the reconfigurable hardware 30 has a read address generation unit 35, read address selectors (AR-SELs) 36-0 to 36-3, read data selectors (DR-SELs) 37-0 to 37-4, a write address generation unit 38, write address selectors (AW-SELs) 39-0 to 39-3, write data selectors (DW-SELs) 40-0 to 40-3, and a write control signal generation unit 41 as a configuration included in the LM-I/F 33 in addition to the already mentioned LMs 31-0 to 31-3, reconfiguration unit (RU) 33, and CS-MEM 34.

In the examples of FIG. 2 and FIG. 3, the reconfiguration unit (RU) 33 includes the processor units (PUs) 33-0 to 33-3, the read address generation unit 35 includes a plurality of read address generators (AGRs) 35-0 to 35-3, the write address generation unit 38 includes a plurality of write address generators (AGWs) 38-0 to 38-3, and the write control signal generation unit 41 includes a plurality of write control signal generators (WEs) 41-0 to 41-3.

Note that the unit including the read address selectors (AR-SELs) 36-0 to 36-3, the read data selectors (DR-SELs) 37-0 to 37-4, the write address selectors (AW-SELs) 39-0 to 39-3, the write data selectors (DW-SELs) 40-0 to 40-3, and the write control signal generation unit 41 is an embodiment of the memory access control device of the present invention. The processor units (PUs) 33-0 to 33-3 are an embodiment of the processing execution unit of the present invention. The unit including the read address selectors (AR-SELs) 36-0 to 36-3 is an embodiment of the read address selection unit of the present invention. The unit including the write address selectors (AW-SELs) 39-0 to 39-3 is an embodiment of the write address selection unit of the present invention. The unit including the read data selectors (DR-SELs) 37-0 to 37-4 is an embodiment of the read data selection unit of the present invention. The unit including the write data selectors (DW-SELs) 40-0 to 40-3 is an embodiment of the write data selection unit of the present invention. The write control signal generation unit 41 is an embodiment of the write control signal generation unit of the present invention. The read address generation unit 35 is an embodiment of the read address generation unit of the present invention. The write address generation unit 38 is an embodiment of the write address generation unit of the present invention.

Each processor unit (PU) 33-n (n indicates an integer of 0 to 3) is a unit performing predetermined processing and is reconfigured based on the configuration information CS supplied from the configuration information memory (CS-HEM) 34. The content of the processing can be changed in accordance with the configuration information CS. Further, the PU 33-n performs predetermined processing on the read data of the LMs 31-0 to 31-3 output from the reading port PR-n and inputs the processing results as the write data from the writing port PW-n to the LMs 31-0 to 31-3.

Each read address generator (AGR) 35-n generates a read address ARn instructing the TM to be read by the PU 33-n and a storage region thereof. Namely, the read address ARn generated by the AGR 35-n includes address information ARSn instructing the memory to be read from among four LMs (31-0 to 31-3) and address information ARMn instructing a storage region inside the instructed LM. For example, when each of the LMs 31-0 to 31-3 has a memory capacity of 1K words, the AGR generates 10 bits of data as the address information ARMn. Further, the AGR generates 2 bits of data as the address information ARSn instructing one of the four LMs (31-0 to 31-3). When the address information ARSn is comprised of the upper bits, and the address information ARMn is comprised of the lower bits, the read address ARn generated by the AGR 35-n becomes the address in the logic address space encompassing the address spaces of the LMs 31-0 to 31-3.

Each read address selector (AR-SEL) 36-n selects the address to be supplied to the LM 31-n in accordance with the configuration information CS supplied from the CS-MEM 34 from among the read addresses AR0 to AR3 generated at the read address generators (AGRs) 35-0 to 35-3 and the addresses Asys input from the system bus Bsys as the addresses for accessing the LMs 31-0 to 31-3 from the outside of the reconfigurable hardware 30. For example, as shown in FIG. 2, the AR-SEL 36-n receives as input the address information indicating the storage region inside the LM and performs the selection. Namely, among the read addresses AR0 to AR3 generated at the AGRs 35-0 to 35-3, the address information ARM0 to ARM3 indicating the storage regions inside the LM are input. Further, the AR-SEL receives as input the address information AMsys indicating the storage region inside the LM from among the addresses Asys input from the system bus Bsys. Then, the AR-SEL selects the address to be supplied to the LM 31-n in accordance with the configuration information CS supplied from the CS-MEM 34 from among these input address information.

Each read data selector (DR-SEL) 37-n selects the read data to be output to the reading port PR-n in accordance with the address ARn generated from the read address generator (AGR) 35-n from among the read data read out from the LMs 31-0 to 31-3 in response to the supply of the read address. As mentioned above, the read address ARn generated from the AGR 35-n is an address for reading the data to be supplied to the PU 33-n. This read data is supplied to the PU 33-n via the reading port PR-n. Therefore, it is an address generated corresponding to the reading port PR-n. Namely, the DR-SEL 37-n selects the read data to be output to the reading port PR-n from among the plurality of read data read out from the LM in accordance with the address ARn generated linked with the destination reading port PR-n. According to the example of FIG. 2, specifically the DR-SEL selects the read data to be output to the reading port PR-n in accordance with the address information ARS-n instructing the memory to be accessed included in this address ARn.

Each read data selector (DR-SEL) 37-4 selects the read data to be output to the input/output port Psys in accordance with the address Asys input from the system bus Bsys from among the read data read out from the LMs 31-0 to 31-3 in response to the supply of the read address. The input/output port Psys is the port for accessing the IMs 31-0 to 31-3 from the outside of the reconfigurable hardware 30 and is connected to the system bus Bsys. Accordingly, the data Dsys output from the DR-SEL 37-4 is output via the input/output port Psys to the data bus Bsys. According to the example of FIG. 2, specifically the DR-SEL selects the read data to be output to the input/output port Psys in accordance with the address information ASsys instructing the memory to be accessed included in the address Asys.

Each AGW (address generator for write) 38-n generates an address indicating an LM to be written in by the PU 33-n and a storage region thereof based on the configuration information CS supplied from the CS-MEM 34. Namely, the write addresses AW0 to AW3 generated by the AGW 38-n include address information AWSn instructing the memory to be written in from among four IMs (31-0 to 31-3) and address information AWMn instructing a storage region inside the instructed LM. When the address information AWSn is comprised of the upper bits, and the address information AWMn is comprised of the lower bits, the write addresses AW0 to AW3 generated by the AGW 38-n become addresses on the logic address space encompassing the address spaces of the LMs 31-0 to 31-3 in the same way as the above read addresses AR0 to AR3.

Each write address selector (AW-SEL) 39-n selects an address to be supplied to the LM 31-n from among the write addresses AW0 to AW3 generated at the AGWs 38-0 to 38-3 and the address Asys input from the system bus Bsys in accordance with the configuration information CS supplied from the CS-MEM 34. For example, as shown in FIG. 3, the AW-SEL 39-n receives as input the address information indicating the storage region inside the LM and performs the selection thereof. Namely, the AW-SEL 39-n receives as input the address information AWM0 to AWM3 instructing the storage regions inside the LMs among the write addresses AW0 to AW3 generated at the AGWs 38-0 to 38-3 and, at the same time, receives as input the address information AMsys indicating the storage regions inside the LMs among the addresses Asys input from the system bus Bsys. Then, the AW-SEL selects the address to be supplied to the LM 31-n in accordance with the configuration information CS supplied from the CS-MEM 34 from among these input address information.

Each write data selector (DW-SEL) 40-n selects write data to be supplied to the LM 31-n from among the write data input via the writing ports PW-0 to PW-3 and the input/output port Psys in accordance with the configuration information CS supplied from the CS-MEM 34. In the example of FIG. 3, the configuration information CS supplied to the DW-SEL 40-n is the same as the configuration information CS supplied to the write address selector (AW-SEL) 39-n. As will be mentioned later, the configuration information CS supplied to the AW-SEL 39-n and the DW-SEL 40-n is the information linking the LMs and ports. When a certain address is selected at the AW-SEL 39-n, the DW-SEL 40-n selects the write data input from the port corresponding to this selected address. For example, when the address information AWM1 is selected at the AW-SEL 39-n, since the address information AWM1 is the address for writing the processing result of the PU 33-1 into the LM, the DW-SEL 40-n selects the data input from the writing port PW-1 connected to the PU 33-1. Further, when the AW-SEL 39-n selects the address information AMsys, since the address information AMsys is the address for writing the data input from the input/output port Psys into the LM, the DW-SEL 40-n selects the data input from the input/output port Psys.

The write control signal generator (WE) 41-n generates the write control signal permitting or prohibiting data writing in the LM 31-n in accordance with whether or not the write address selected at the write address selector (AW-SEL) 39-n is an address instructing the LM 31-n as the destination of this write address to be written. For example, as shown in FIG. 3, the WE 41-n receives as input the same configuration information as that supplied to the AW-SEL 39-n and, at the same time, receives as input the address information (ASW0 to AWS3, ASsys) for instructing the memory to be written in. Further, the WE specifies the address information (AWS0 to AWS3, ASsys) corresponding to the address selected at the AW-SEL 39-n and judges whether or not the specified address information instructs the TM 31-n to be written in. The WE generates a write control signal permitting or prohibiting data writing in the LM 31-n in accordance with this judgment result.

The operation of the processing system shown in FIG. 1 having the above configuration will be explained particularly focusing on the portion relating to the access control of the LMs in the reconfigurable hardware 30.

The processing unit 10 executes predetermined processing based on a program stored in a not shown storage unit. In the process of the processing, when the configuration information CS is written into the CS-MEM 34 of the reconfigurable hardware 30 in accordance with the control of the processing unit 10, the written configuration information CS is supplied to the reconfiguration unit (RU) 33 and the LM-I/F 32, and the internal states thereof are set in accordance with the configuration information CS. For example, the contents of the processing at the PUs 33-0 to 33-3, the values of the addresses generated at the read address generation unit 35 and the write address generation unit 38 and their generation timings, the addresses selected at the read address selectors (AR-SELs) 36-0 to 36-3 and the write address selectors (AW-SELs) 39-0 to 39-3, the data selected at the read data selectors (DR-SELs) 37-0 to 37-4 and the write data selectors (DW-SELs) 40-0 to 40-3, and the value of the write control signal generated at the write control signal generation unit 41 are set in accordance with the configuration information CS written into the CS-MEM 34.

Figure 4:
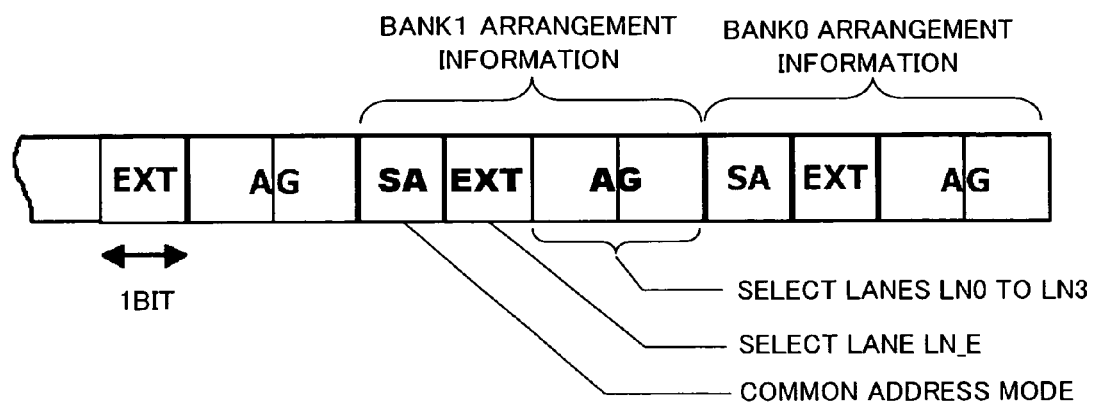
FIG. 4 is a diagram illustrating an example of configuration information supplied to a read address selector and a write address selector in the present embodiment.

FIG. 4 is a diagram illustrating an example of the configuration information CS supplied to the read address selectors (AR-SELs) 36-0 to 36-3 and the write address selectors (AW-SEL) 39-0 to 39-3. Note that the configuration information CS supplied to each write data selector (DW-SEL) 40-n and write control signal generator (WE) 41-n is the same as the configuration information CS supplied to each AW-SEL 39-n as mentioned above. The configuration information CS supplied to these units is information relating to the arrangement of the address space of each LM above the logic address space, therefore, in the following explanation, this configuration information CS will be called the "arrangement information". The arrangement information AI is represented by 4 bits of data for example as shown in FIG. 4.

Among these 4 bits, 2 bits of the data AG are data for setting the address generators (35-0 to 35-3, 38-0 to 38-3) as supplying sides of the addresses to be selected at the address selectors (36-0 to 36-3, 39-0 to 39-3). For example, when the arrangement information AI having data AG of a value '3' is supplied to the AR-SEL 36-n, the AR-SEL 36-n selects the address information ARM3 generated at the AGR 35-3 and supplies it to the LM 31-n. Further, for example, when the arrangement information AI having data AG of a value '1' is supplied to the AW-SEL 39-n, the AW-SEL 39-n selects the address information AWM1 generated at the AGW 38-1 and supplies it to the TM 31-n.

Note that, the address generators (35-0 to 35-3, 38-0 to 38-3) are provided in a one-to-one correspondence with the ports (PR-0 to PR-3, PW-0 to PW-3) connected to the PUs (33-0 to 33-3), therefore this data AG is also the data indicating the port. Namely, by the supply of this data AG to the address selectors (36-0 to 36-3, 39-0 to 39-3) corresponding to the LMs (31-0 to 31-3), the linkage between the LMs (31-0 to 31-3) and the ports (PR-0 to PR-3, PW-0 to PW-3) to or from which the data accessing the LMs are input or output is set.

Among the arrangement information AI, the 1 bit of the data EXT is the data for setting the input/output port Psys connected to the system bus Bsys as the port to or from which the data for accessing the LMs (31-0 to 31-3) are input or output. For example, when the data EXT is '0', the data AG becomes valid, and the LMs (31-0 to 31-3) are linked to the ports (PR-0 to PR-3, PW-0 to PW-3) connected to the PUs 33-0 to 33-3 as mentioned above. On the other hand, when the data EXT is '1', the data AG becomes invalid, and the LMs (31-0 to 31-3) are linked to the input/output port Psys. For example, when the data EXT is set at '1' in the arrangement information AI supplied to the AR-SEL 36-n, the address information AMsys input from the system bus Bsys is selected as the read address to be supplied to the TM 31-n. Further, when the data EXT is set at '1' in the arrangement information AI supplied to the AW-SEL 39-n, the address information AMsys input from the system bus Bsys is selected as the write address to be supplied to the LM 31-n. In this way, the linkage between the LMs (31-0 to 31-3) and the input/output port Psys is set by the data EXT of the arrangement information AI.

In the arrangement information AI, the 1 bit of the data SA is the data for making the common address mode mentioned later valid or invalid. For example, the common address mode becomes valid when the data SA is set at '0', while becomes invalid where the data SA is set at '1'.

Figure 5:
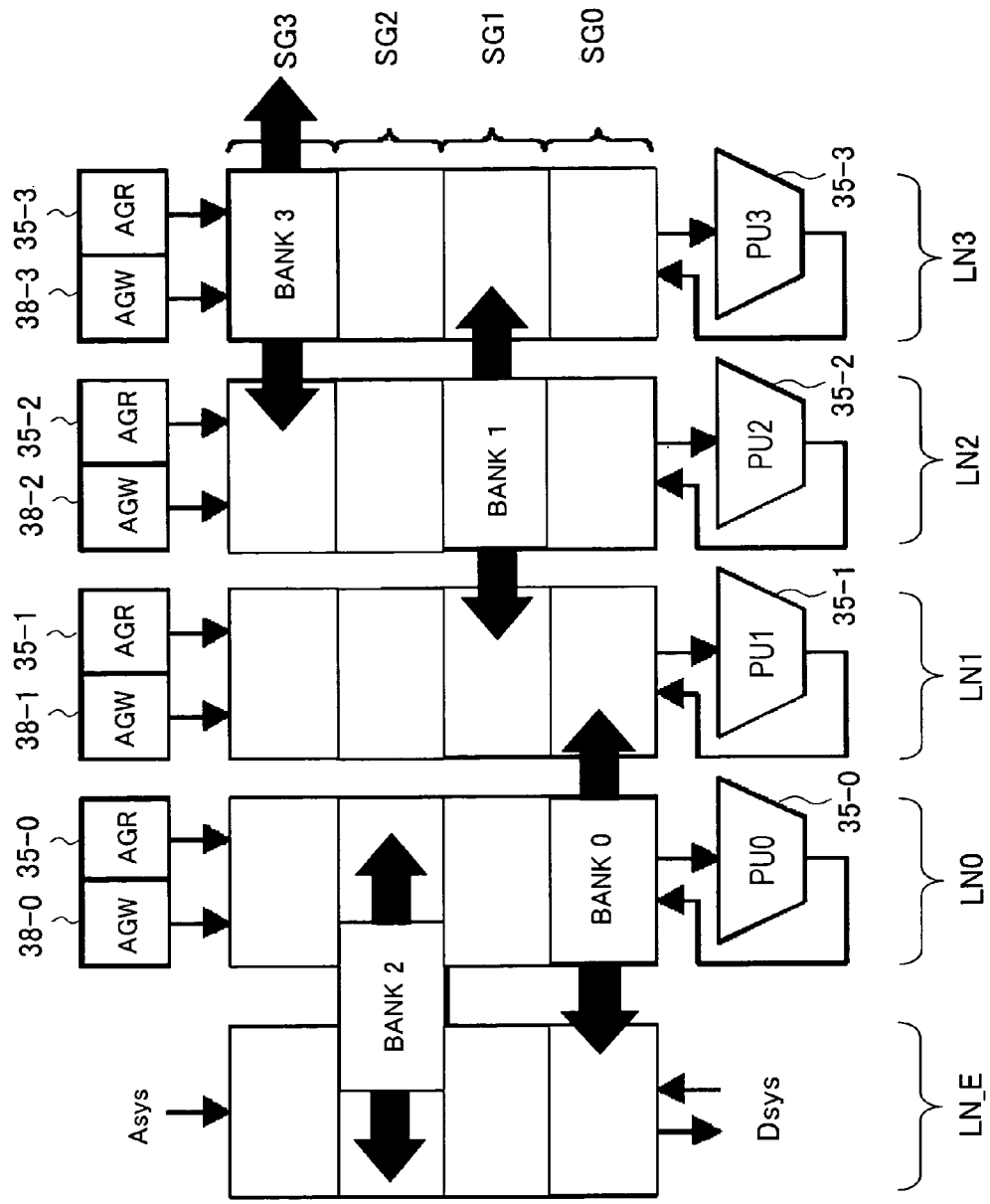
FIG. 5 is a diagram illustrating a state of arrangement of physical address spaces of LMs above logic address spaces corresponding to ports in the present embodiment.

FIG. 5 illustrates the state of the arrangement of physical address spaces of the LMs above the logic address spaces corresponding to the ports by such arrangement information AI. The same notations in FIG. 5 and FIG. 1 to FIG. 3 indicate the same components.

All of the addresses (AR0 to AR3, AW0 to AW3) generated at the address generators (AGR 35-0 to 35-3, AGW 38-0 to 38-3), and the address Asys input from the system bus Bsys are addresses indicating LMs to be accessed and the storage regions thereof. For this reason, these addresses can be regarded as addresses on the logic address space encompassing the address spaces of four LMs (31-0 to 31-3).

These addresses are addresses generated or input in a one-to-one correspondence with ports (PR-0 to PR-3, PW-0 to PW-3, Psys).

It is set by the linkage between the LMs and ports according to the arrangement information AI mentioned above whether or not the ports (PR-0 to PR-3, PW-0 to PW-3, Psys) can access the local memories (31-0 to 31-3). Accordingly, the range of the addresses accessible on the logic address space differs for each port. Therefore, in the following explanation, logic address spaces linked with the ports are assumed. These will be called "lanes".

In FIG. 5, a lane LN_E corresponds to the port Psys, and a lane LNn corresponds to the reading port PR-n and the writing port PW-n. The example of FIG. 5 is an example of the case where the linkup between the LMs and ports is set so that the read access and the write access with respect to one LM are executed from a common PU (or system bus Bsys). In this way, when the PU executing the read access and write access with respect to one LM is the same, the read access and the write access are not simultaneously generated, therefore use can be made of a single port memory as the LM.

On the other hand, by using a dual port memory as the LM, it is also possible to execute the read access and the write access with respect to one TM from different PUs (or system bus Bsys). In this case, for example as shown in FIG. 7, independent lanes are linked with the reading port and the writing port.

Each lane is divided into a plurality of address ranges corresponding to the physical address spaces of the LMs (31-0 to 31-3). In the following explanation, the physical address spaces of the LMs (31-0 to 31-3) will be called "banks", and address ranges corresponding to banks on lanes will be called "segments". In the example of FIG. 5, segments SG0 to SG3 correspond to the banks of the LMs 31-0 to 31-3.

Figure 7:
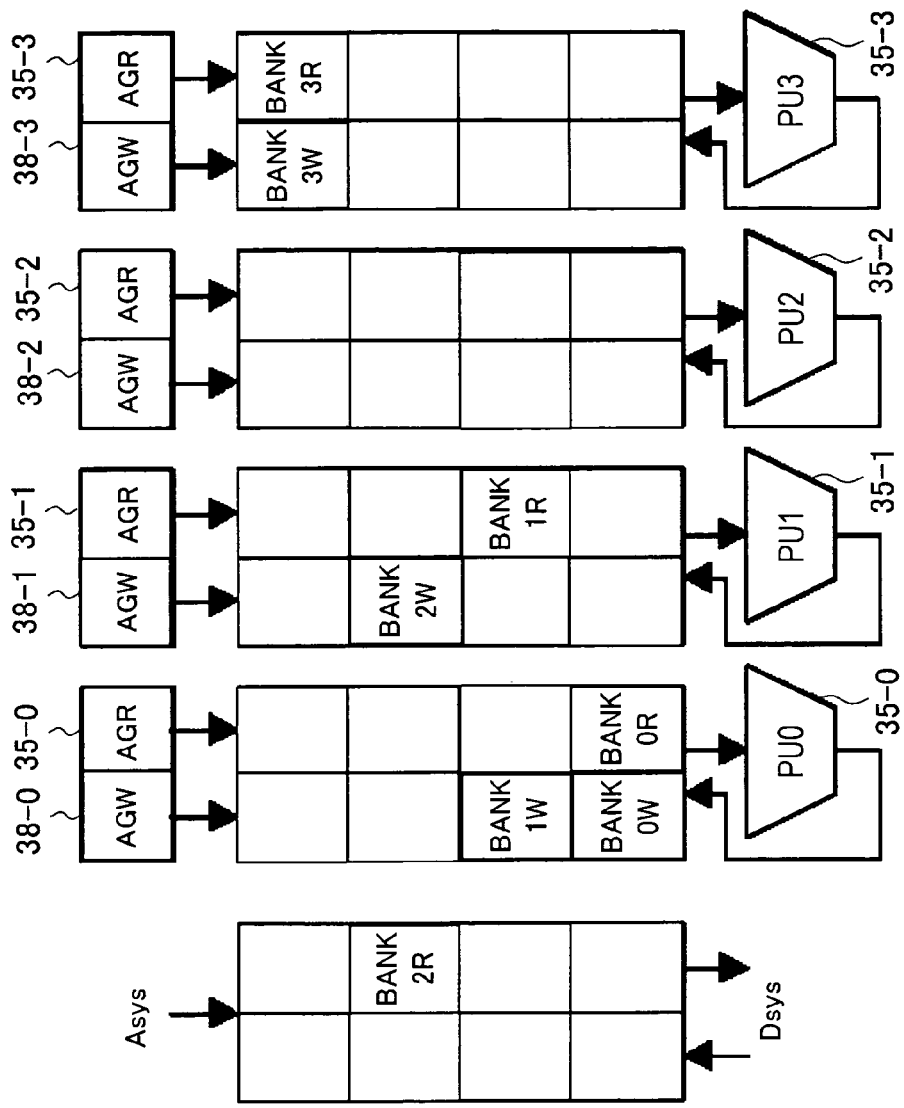
FIG. 7 is a diagram illustrating an example of an arrangement of banks where independent lanes are linked with reading ports and writing ports in the present embodiment.
Figure 8:
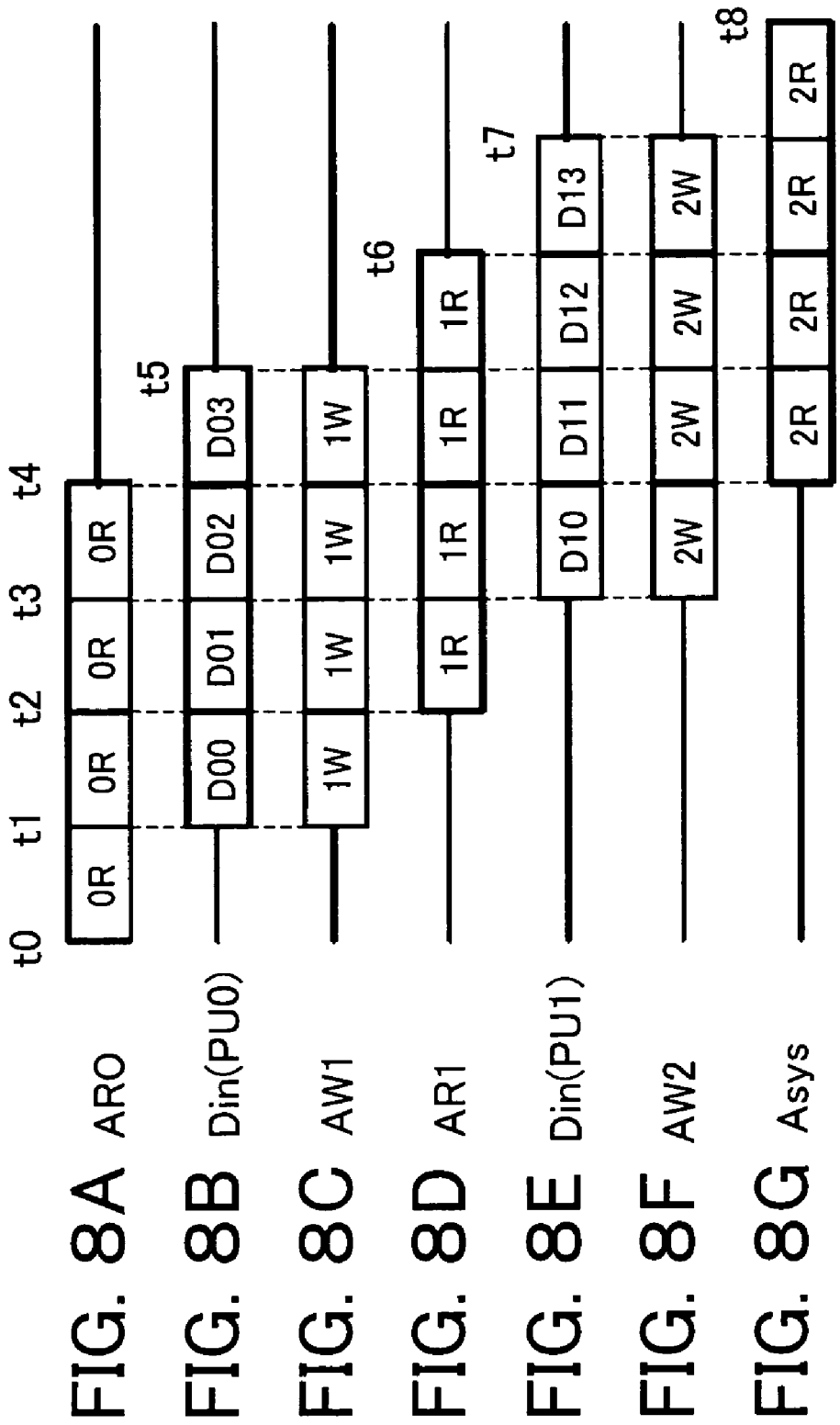
FIG. 8A to FIG. 8G are timing charts showing an example of the address generation timings of address generators in the bank arrangement shown in FIG. 7.

When the LMs are constructed by using dual port memories, for example as shown in FIG. 7, each LM has two banks for reading and writing.

Each lane has at least a memory size equal to that obtained by adding up the memory sizes of the banks of the LMs.

As mentioned above, the LMs accessible from the ports (PR-0 to PR-3, PW-0 to PW-3, Psys) are set in accordance with the arrangement information AI. As visually shown in FIG. 5, it can be considered that the banks are arranged on the segments corresponding to the lanes. Namely, the arrangement of a certain bank in a certain lane means that access to the segment corresponding to the bank on the lane from the port corresponding to the lane becomes possible.

When the arrangement of the banks in the lanes is set as described above in accordance with the arrangement information AI, the read access and the write access with respect to the LMs (31-0 to 31-3) from the ports (PR-0 to PR-3, PW-0 to PW-3, Psys) are controlled based on this arrangement information AI. For example, when the read access is executed with respect to the LM 31-n, to the LM 31-n, the read address (temporarily called as an address Ax) generated or input corresponding to the lane in which the bank is arranged (temporarily called as a lane LNx) is selected by the read address selector (AR-SEL) and supplied. The data read out from the LM 31-n is selected at the read data selector (DR-SEL) 37-m (m indicates an integer of 0 to 4) corresponding to the lane LNx when the address Ax is an address instructing the LM 31-n to be accessed and output to the port corresponding to the lane LNx.

When the address Ax corresponding to the lane LNx does not instruct the LM 31-n to be accessed, but instructs another LM arranged in the lane LNx to be accessed, the DR-SEL 37-m selects the read data valid for the setting of the arrangement information AI. On the other hand, when the address Ax corresponding to the lane LNx instructs an LM which is not arranged in the lane LNx to be accessed, the DS-SEL 37-m selects data invalid for the setting of the arrangement information AI.

In order to prevent the selection of such invalid data, for example, suitable configuration information AI may be supplied to the AGRs (35-0 to 35-3) so that the addresses generated at the read address generators (AGRs 35-0 to 35-3) instruct LMs valid for the setting of the arrangement information AI to be accessed.

Alternatively, for example, a read control signal generation unit for generating a read control signal indicating whether or not the read data selected at the read data selection unit is valid may be provided as well. This read control signal generation unit judges whether or not the LM of the supplier of the read data selected at the read data selection unit and the port of the destination of the selected read data are linked in the supplied configuration information CS and generates a read control signal indicating whether or not the selected read data is valid in accordance with the judgment result.

By providing such a read control signal generation unit, at the PU etc. receiving the read data, it becomes possible to grasp whether or not the received read data is valid for the setting of the arrangement information AI. For example, when a read control signal indicating that the read data is invalid is generated, the PU receiving this read data can also stop the processing. Due to this, the processing need not be applied to invalid read data, and useless power consumption can be reduced.

When the TM 31-n is accessed for writing, the LM 31-n is supplied with the write address (provisionally called as the "address Ay") generated or input corresponding to the lane in which the bank is arranged (provisionally called the "lane LNy") selected by the AW-SEL 39-n and is supplied with the write data input from the port corresponding to the lane LNy selected by the DW-SEL 40-n.

When the address selected by the AW-SEL 39-n instructs the LM 31-n to be accessed, the write control signal generator (WE) 41-n generates a write control signal for permitting the data writing in the LM 31-n. In this case, the write data input from the port corresponding to the lane LNy is written into the TM 31-n.

When the TM 31-n is not to be accessed in the address selected by the AW-SEL 39-n, the write control signal generator (WE) 41-n generates a write control signal for prohibiting the data writing in the IM 31-n. In this case, the write data input from the port corresponding to the lane LNy is not written into the IM 31-n.

The arrangement of the banks will be explained with respect to the lanes by referring to FIG. 6 to FIG. 10.

Figure 6:
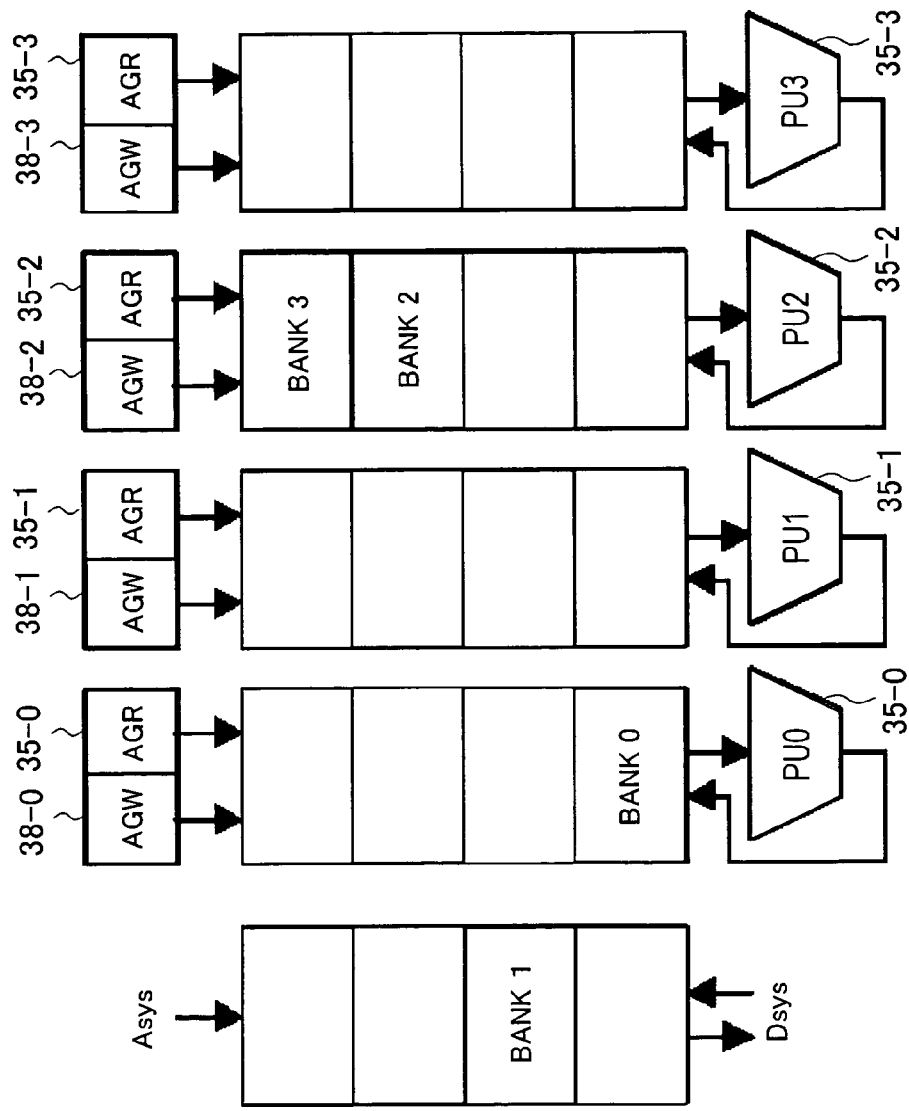
FIG. 6 is a diagram illustrating an example of arranging a plurality of banks in one lane in the present embodiment.

FIG. 6 is a diagram illustrating an example of arranging a plurality of banks in one lane.

In the example of FIG. 6, the bank of IM 31-2 (Bank 2) and the bank of LM 31-3 (Bank 3) are arranged in the lane LN2 corresponding to the reading port PR-2 and the writing port PW-2 of the PU 33-2. The bank of IM 31-0 (Bank 0) is arranged in the lane LN2 corresponding to the reading port PR-0 and the writing port PW-0 of the PU 33-0, and the bank of LM 31-1 (Bank 1) is arranged in the lane LN_E corresponding to the input/output port Psys.

In the example of FIG. 6, no banks are arranged in the lanes LN1 and LN3 of the PUs 33-1 and 33-3, while two banks are arranged in the lane LN2 of the PU 33-2. In this way, useless banks are not arranged in the lanes of the PUs not needing input data due to the stopped state etc., but spare banks are arranged in the lanes of the other PUs needing input data, so the storage size of the data in those lanes can be increased. Namely, by arranging banks freely in the lanes, an improvement of the efficiency of utilization of the LMs can be achieved.

In the example of FIG. 6, the bank of the LM 31-1 is arranged in the lane LN_E, therefore even in the middle of the execution of the processing in the PU 33-0 or PU 33-2, it is possible to write the data ready for the next processing from the system bus Bsys into the LM 31-1 and read out the result of the previously performed processing from the IM 31-1 to the system bus Bsys. Namely, it becomes possible to access an LM inside the reconfigurable hardware 30 from an external bus in the state where the PU is operated. Accordingly, in comparison with the dynamically reconfigurable hardware shown in FIG. 11 where an TM cannot be accessed from an external bus unless the PU is stopped, the delay time of processing can be reduced.

FIG. 7 is a diagram illustrating an example of the arrangement of banks where independent lanes are linked with the reading ports and writing ports.

In the example of FIG. 7, a dual port memory is used for each LM, and each LM has a reading bank and writing bank. Further, the reading bank is arranged in the lane corresponding to the reading port, and the writing bank is arranged in the lane corresponding to the writing port.

As shown in FIG. 7, the reading bank (Bank OR) of the LM 31-0 is arranged in the lane corresponding to the reading port PR-0 of the PU 33-0, and the writing bank (Bank OW) of the TM 31-0 and the writing bank (Bank 1W) of the TM 31-1 are arranged in the lane corresponding to the writing port PW-0.

The reading bank (Bank 1R) of the IM 31-1 is arranged in the lane corresponding to the reading port PR-1 of the PU 33-1, and the writing bank (Bank 2W) of the LM 31-2 is arranged in the lane corresponding to the writing port PW-1.

The reading bank (Bank 3R) of the LM 31-3 is arranged in the lane corresponding to the reading port PR-3 of the PU 33-3, and the writing bank (Bank 3W) of the LM 31-3 is arranged in the lane corresponding to the writing port PW-3.

The reading bank (Bank 2R) of the LM 31-2 is arranged in the lane for performing the read access from the input/output port Psys.

In such a bank arrangement, each address generator (AGW, AGR) generates an address at the timing as shown in for example FIGS. 8A to 8G based on the configuration information CS supplied from the CS-MEM 34.

At the timings t0 to t4, the AGR 35-0 generates the read address AR0 with respect to the reading bank (Bank 0R) of the LM 31-0 (FIG. 8(A)). The data (D00 to D03) read out from the reading bank (Bank 0R) in response to the supply of this read address are sequentially output to the PU 33-0 from the timing t1 to the timing t5 (FIG. 8(B)).

Matching with the timing of reading the data (D00 to D03) from the reading bank (Bank 0R), the write address AW0 with respect to the writing bank (Bank 1W) of the LM 31-1 is generated from the AGW 38-0 (FIG. 8(C)). The writing bank (Bank 1W) is arranged in the writing lane of the PU 33-0, therefore the processing results of PU 33-0 with respect to the data D00 to D03 are sequentially written into the writing bank (Bank 1W).

The processing results of the PU 33-0 written into the writing bank (Bank 1W) at the timings t1 to t5 are sequentially read out from the corresponding reading bank (Bank 1R) from the timing t3 to the timing t7 by the read address AR1 (FIG. 8(D)) of the AGR 35-1 generated at the timings t2 to t6. This reading bank (Bank 1R) is arranged in the reading lane of the PU 33-1, therefore the data (D10 to D13) read out from this bank as the processing results of the PU 33-0 are sequentially output to the PU 33-1 (FIG. 8(E)).

Matching with the timings when the data (D10 to D13) are read out from the reading bank (Bank 1R), the write address AW2 with respect to the writing bank (Bank 2W) of the LM 31-2 is generated from the AGW 38-1 (FIG. 8JF)). This writing bank (Bank 2W) is arranged in the writing lane of the PU 33-1, therefore the processing results of the PU 33-1 with respect to the data D10 to D13 are sequentially written into the writing bank (Bank 2W).

The processing results of the PU 33-1 written into the writing bank (Bank 2W) at the timings t3 to t7 are sequentially read out from the corresponding reading bank (Bank 2R) by the address Asys (FIG. 8(G)) input from the system bus Bsys from the timing t4 to the timing t8. This reading bank (Bank 2R) is arranged in the reading lane of the input/output port Psys, therefore the read data as the processing results of the PU 33-1 are sequentially output from the input/output port Psys to the system bus Bsys.

By setting the linkage between the LMs and the ports by the arrangement information AI for each of the reading ports and the writing ports in this way, it becomes possible to transfer data among PUs inside the reconfigurable hardware 30. Accordingly, in comparison with the dynamically reconfigurable hardware shown in FIG. 11 unable to transfer data among PUs unless using an external memory, the present embodiment can greatly simplify the routine of the processing, and thus the processing speed can be raised.

In the present embodiment, when using dual port memories as the LMs, data can be transferred among PUs parallel to the processing of PU, therefore the processing speed can be further raised.

Figure 9:
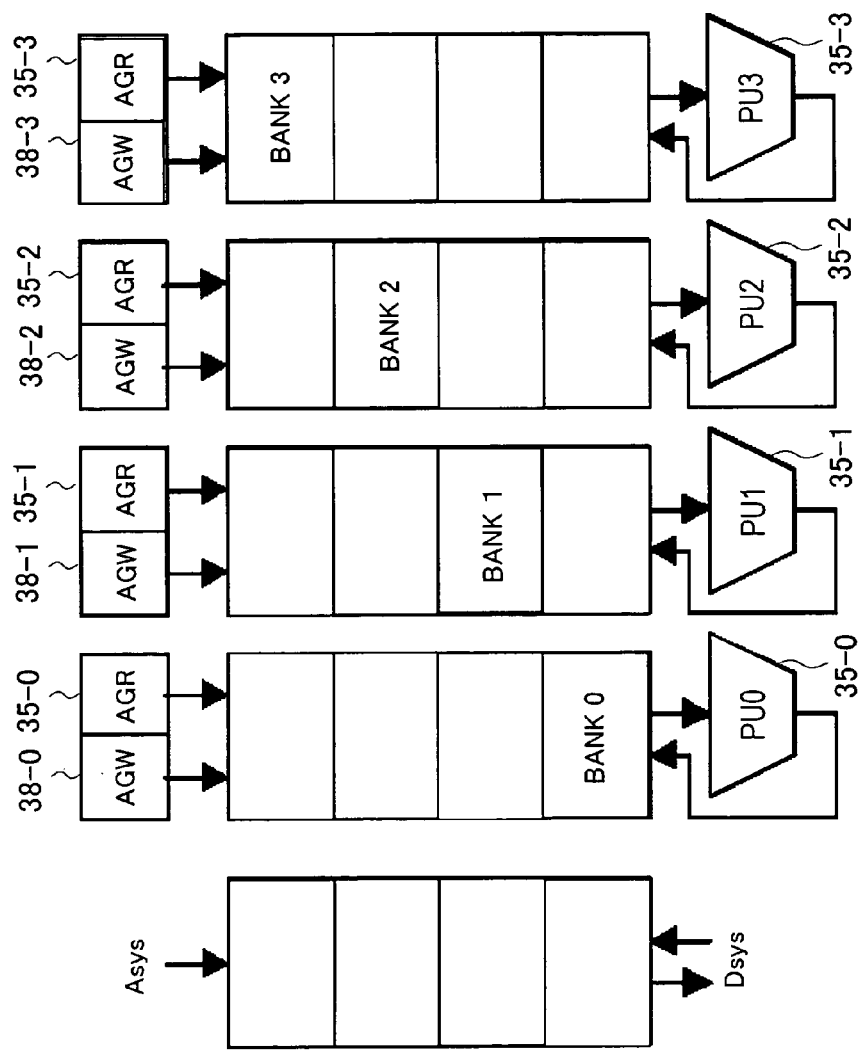
FIG. 9 is a diagram illustrating an example of the arrangement of banks in the lanes in the present embodiment.

FIG. 9 is a diagram illustrating an example where banks are arranged in lanes.

In the example of FIG. 9, banks of LMs 31-0 to 31-3 (Bank 0 to Bank 3) are arranged in the lanes LN0 to LN3 corresponding to the PUs 33-0 to 33-3.

According to such a bank arrangement, LMs to be accessed are assigned to PUs. In the same way as the dynamically reconfigurable hardware shown in FIG. 11, the processing can be executed in parallel in four PUs 33-0 to 33-3. Note that differs from the dynamically reconfigurable hardware shown in FIG. 11 in the point that the address generated at the address generator 35 and the address input from the system bus Bsys must include the address information (ARS0 to ARS3, AWS0 to AWS3, ASsys) indicating the LMs to be accessed.

Figure 10:
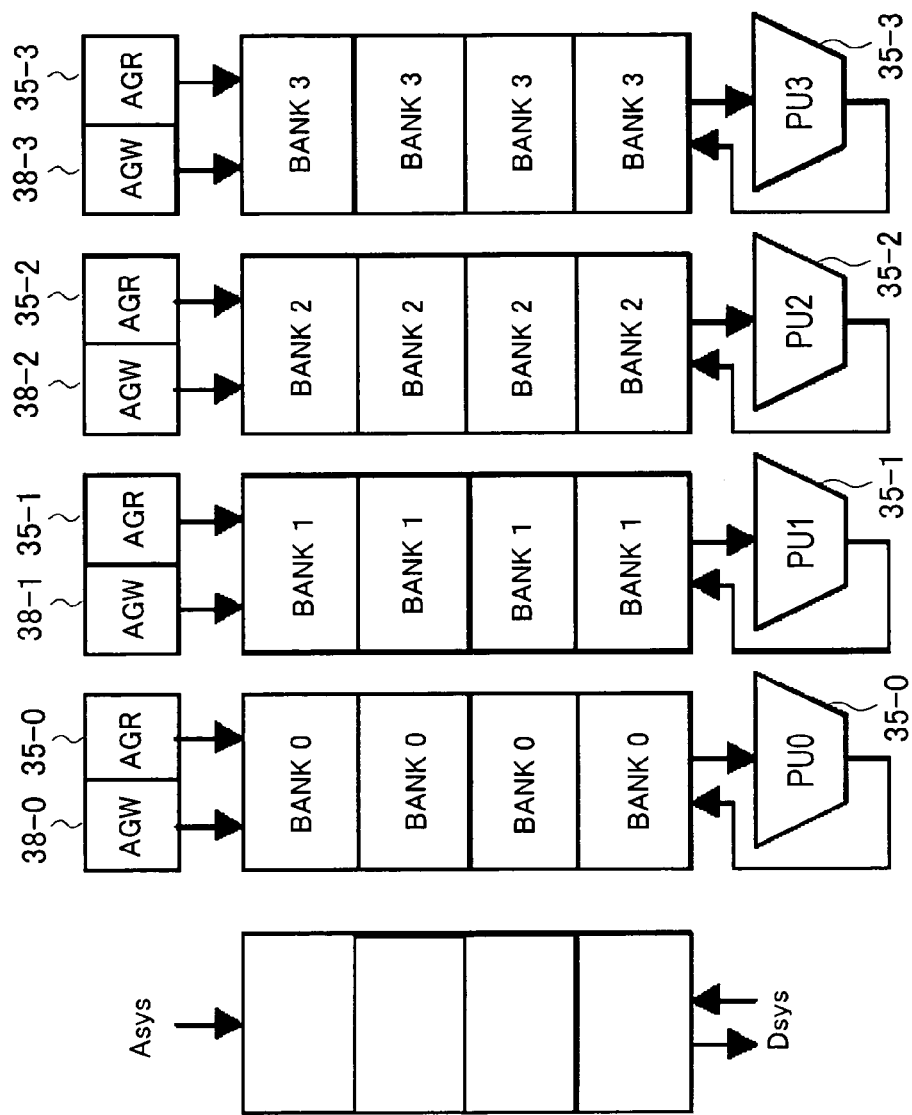
FIG. 10 is a diagram illustrating an example of the arrangement of banks when banks are arranged in lanes and the banks are set in an address sharing mode in the present embodiment.

FIG. 10 is a diagram illustrating an example of the bank arrangement in a case where banks are arranged in lanes and where the banks are set in an address sharing mode.

The address sharing mode is a mode for invalidating the address information (ARS0 to ARS31 AWS0 to AWS3, ASsys) indicating the LMs to be accessed and is set for each bank. In the bank set in the address sharing mode, it becomes possible to use an address to be accessed by another LM as an address to be accessed by itself.

When the reading bank of the TM 31-n is set in the address sharing mode, a specific reading port predetermined with respect to this TM 31-n, for example, the reading port PR-n, is set as the output destination of the read data. In this case, even when the address information ARSn is for reading another LM, the read data of the LM 31-n is output to the reading port PR-n irrelevant to this. Explaining this in more detail, the DR-SEL 37-n corresponding to the specific reading port PR-n of the LM 31-n receives as input the data SA (refer to FIG. 4) included in the arrangement information of the reading bank of the LM 31-n. When this data SA is set at '0', the reading bank of the LM 31-n enters the address sharing mode and becomes able to use an address which another LM reads as an address which it itself reads. At this time, in the DR-SEL 37-n, irrelevant to the address information ARSn, the read data of the LM 31-n is selected and output to the specific reading port PR-n.

When the writing bank of the LM 31-n is set in the address sharing mode, the data input from a specific writing port predetermined with respect to this LM 31-n, for example the writing port PW-n, is input to the TM 31-n. In this case, even when the address information ARSn instructs writing of data to another LM, the writing of the data in the LM 31-n is permitted irrelevant to this. Explaining this in more detail, the arrangement information of the writing bank of the TM 31-n is input to the AW-SEL 39-n and the write control signal generator (WE) 41-n as shown in FIG. 3, but the data SA included in this arrangement information AI is further input to the DW-SEL 40-n. When this data SA is set at '0', the writing bank of the TM 31-n enters the address sharing mode and becomes able to use an address which another LM writes at as an address which it itself writes at. At this time, the AW-SEL 39-n selects the write address AWn corresponding to the specific writing port PW-n of the LM 31-n and supplies this to the IM 31-n. The DW-SEL 40-n selects the data input from the specific writing port PW-n and supplies this to the LM 31-n. The WE 41-n generates the write permission signal for permitting data writing in the LM 31-n irrelevant to the address information AWSn.

In the example of FIG. 10, the banks of all LMs are set in an address sharing mode. The suppliers of the read addresses and write addresses to the LM 31-n are set to the AGR 35-n and AGW 38-n by the data AG of the arrangement information AI (refer to FIG. 4).

In the address sharing mode, address information (ARS0 to ARS3, AWS0 to AWS3, ASsys) instructing LMs to be accessed become invalid, therefore, as shown in FIG. 10, the state becomes equivalent to the state where the same banks are arranged in all segments on the same lanes. Namely, no matter which segment on a lane an address instructs, the same bank always becomes accessed.

Figure 11:
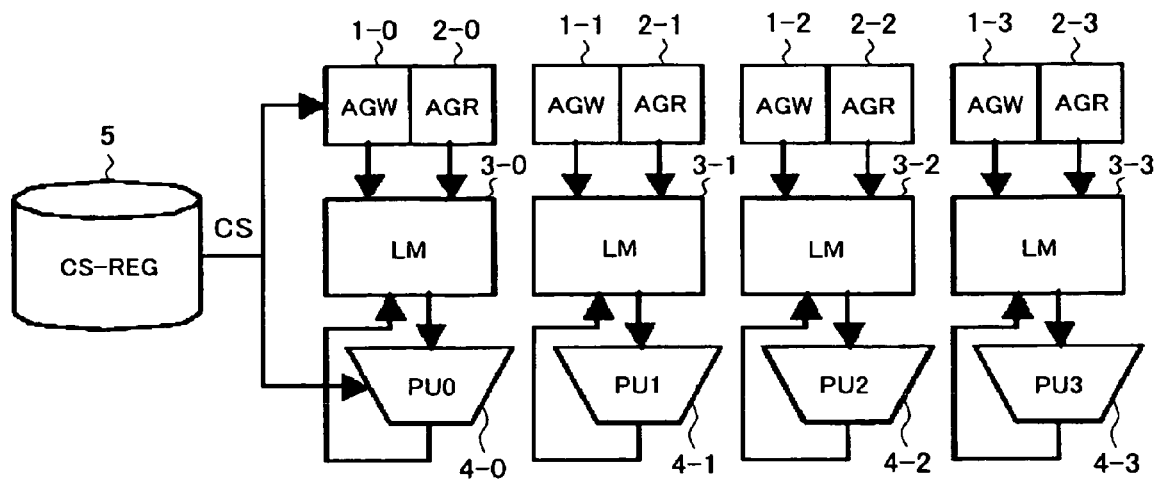
FIG. 11 is a block diagram showing an example of the configuration of general dynamically reconfigurable hardware.
Figure 12:
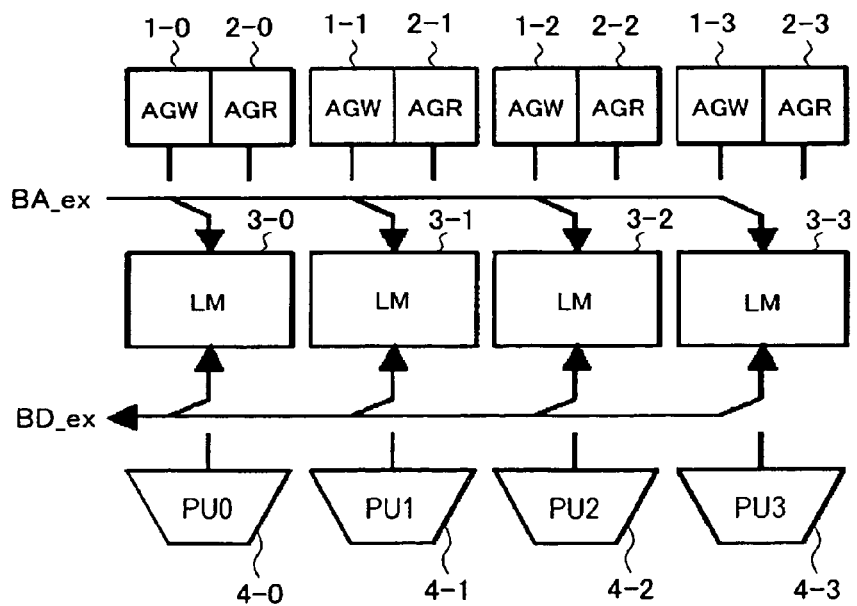
FIG. 12 is a diagram illustrating a state of access performed from an external bus to an internal local memory with respect to the dynamically reconfigurable hardware shown in FIG. 11.
Figure 13:
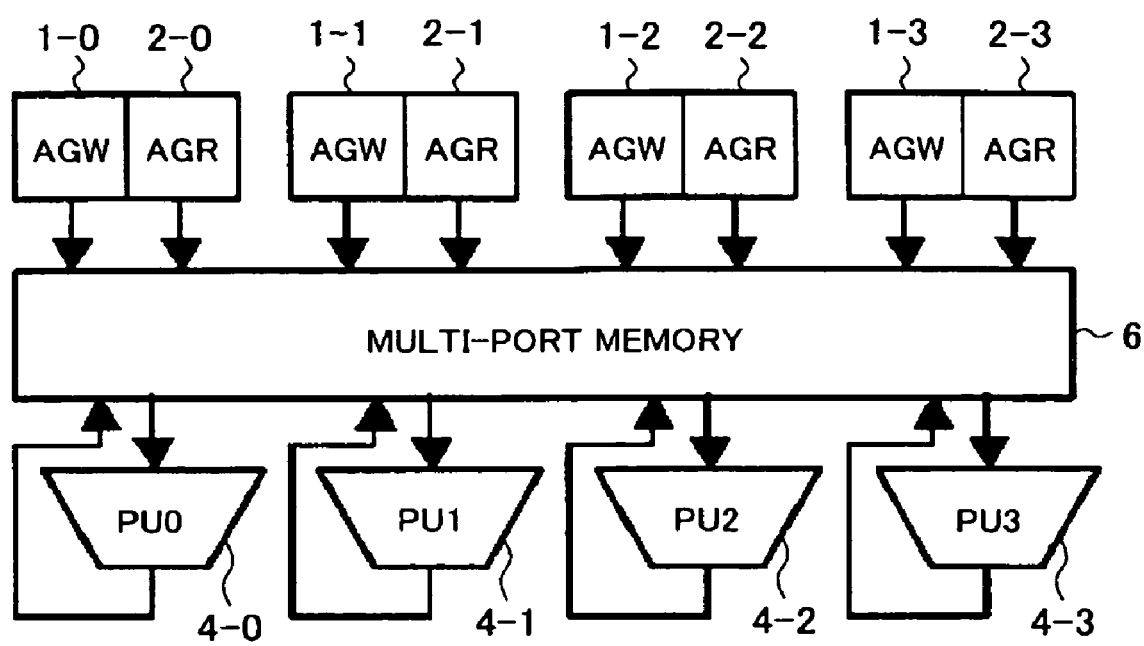
FIG. 13 is a block diagram showing an example of dynamically reconfigurable hardware using a multi-port memory as an internal local memory in FIG. 12.

Accordingly, as shown in FIG. 9, it becomes unnecessary to generate or input the address information (ARS0 to ARS3, AWS0 to AWS3, ASsys) for arranging banks in correct segments of the lanes, therefore it becomes possible to maintain the interchangeability of the configuration information with the conventional dynamically reconfigurable hardware shown in FIG. 11 for which such address information is not assumed.

Further, the supplier of the address to the LM set to the address sharing mode can be freely set by the data AG of the arrangement information AI. In this case, the LM is connected to a specific port, and the bank thereof is arranged in a specific lane as shown in FIG. 10. Accordingly, the data AG of the arrangement information AI becomes not data for setting the linkage between the LMs and the ports, but data simply setting the linkage between the LMs and the address suppliers. In this way, the linkage between the LMs and the address suppliers can be set irrelevant to the lanes, therefore it becomes possible for example for an address generated by one address generator to be shared at a plurality of banks set in the address sharing mode. In this case, in comparison with the method of generating the same address to banks from a plurality of address generators, the power consumption can be reduced.

The example of FIG. 10 is an example where the PU executing the read access and the write access with respect to one TM is the same. For example, when it is possible to execute the read access and the write access with respect to one LM from different PUs (or system buses Bsys) by using a dual port memory as an LM, it is also possible to set only one of the two banks corresponding to one LM (reading bank and writing bank) in the address sharing mode.

In the example of FIG. 10, the port inputting the write data to the bank set in the address sharing mode is fixed to a predetermined specific writing port, but it may be set to any writing port as well. For example, the input port of the write data in the address sharing mode is added to the arrangement information, and this is supplied to the write address selectors (AW-SELs 39-0 to 39-3) and the write data selectors (DW-SELs 40-0 to 40-3). The AW-SELs (39-0 to 39-3) select write addresses (AW0 to AW3, Asys) generated or input corresponding to the port designated in the added information when the address sharing mode setting of the corresponding LM is validated in this arrangement information AI. When the address sharing mode setting of the corresponding TM is validated in this arrangement information AI, the DW-SELs (40-0 to 40-3) select the write data input from the ports designated in the added information and supply the same to the corresponding LMs.

In this way, according to the present embodiment, when the input port of the write data in the address sharing mode can be freely set, it becomes possible to simultaneously write for example the data input from one port to a plurality of banks. Due to this, the processing speed can be greatly raised in comparison with the method of writing the same data into a plurality of banks by dividing it into a plurality of steps.

As explained above, according to the embodiment of the memory access control device of the present invention included in the reconfigurable hardware 30 shown in FIG. 2 and FIG. 3, the LMs (31-0 to 31-3) to be accessed for reading from the ports (PR-0 to PR-3, Psys) from which the read data are output are instructed by the addresses (AR0 to AR3) generated from the read address generators (AGRs 35-0 to 35-3) corresponding to these ports and the address Asys input from the system bus Bsys. The linkage between these LMs and ports is set in the data AG and the data EXT of the arrangement information AI.

The read address selectors (AR-SELs 36-0 to 36-3) select the addresses corresponding to the ports linked with in this arrangement information from among addresses (AR0 to AR3, Psys) generated or input corresponding to these ports and supply the same to the corresponding LMs. The read data selectors (DR-SELs 40-0 to 40-4) select the read data to be output to the corresponding ports (PR-0 to PR-3, Psys) from among the read data read out from a plurality of LMs (31-0 to 31-3) in response to the supply of addresses. The read data is selected in accordance with the addresses (AR0 to AR3, Asys) generated or input corresponding to the destination ports. Namely, the read data from the memory instructed to be accessed in that address is selected.

Accordingly, for each LM, the port for read access can be set by the arrangement information AI. When a plurality of LMs are linked to one port by the arrangement information AI, the LM to be read can be instructed from among the plurality of LMs. Namely, when accessing a plurality of LMs from a plurality of ports for reading, freer read access in comparison with the method of fixing the destination of the read data from the LM to a specific port becomes possible.

The LMs (31-0 to 31-3) to be accessed for writing from ports (PW-0 to PW-3, Psys) to which write data are input are instructed by the addresses (AW0 to AW3) generated from the write address generators (AGWs 38-0 to 38-3) corresponding to these ports or the address Asys input from the system bus Bsys. The linkage between these LMs and the ports is set in the data AG and the data EXT of the arrangement information AI.

The write address selectors (AW-SELs 39-0 to 39-3) select the addresses corresponding to the ports linked with in this arrangement information AI from among addresses (AW0 to AW3, Psys) generated or input corresponding to these ports and supply the same to the corresponding IMs. The write data selectors (DW-SELs 39-0 to 39-3) select the write data input from the ports linked with in the arrangement information AI from among the write data input from a plurality of ports (PW-0 to PW-3, Psys) and supply the same to the corresponding LMs. The write control signal generators (WEs 41-0 to 41-3) generate write control signals for permitting or prohibiting data writing in the LMs of destinations of addresses in accordance with whether or not addresses (AW0 to AW3, Asys) selected at the write address selectors (AW-SELs 39-0 to 39-3) are addresses indicating the LMs as destinations of addresses to be accessed.

Accordingly, for each LM, the port for the write access can be set according to the arrangement information. When a plurality of LMs are linked with one port by the arrangement information AI, the LM to be written in can be instructed from among the plurality of LMs. Namely, when accessing a plurality of LMs for writing from a plurality of ports, freer access in comparison with the method where the destinations of the write data from the LMs are fixed to specific ports becomes possible.

According to the processing system shown in FIG. 1, a plurality of IMs (31-0 to 31-3) inside the reconfigurable hardware 30 can be freely accessed for reading and accessed for writing as described above from the ports (PR-0 to PR-3, PW-0 to PW-3) connected to the reconfigurable PUs (33-0 to 33-3) and the port Psys connected to the system bus Bsys. As a result, for example, it becomes possible to access a plurality of LMs from one port, so the improvement of the efficiency of utilization of the LMs can be achieved. Further, it becomes possible to easily transfer the data among PUs and to speed up the processing. In addition, it is not necessary to use a complex circuit such as a multi-port memory in order to freely access a plurality of LMs from a plurality of ports, therefore the invention can be realized with a simple configuration.

The present invention is not limited to the above embodiment.

For example, the number of LMs and ports and the number of input/output ports connected to the external bus and presence/absence thereof in the above embodiment may be freely set.

Further, the LMs do not all have to be single port memories or dual port memories. For example, they may include single port memories and dual port memories. Further, the LMs do not necessarily have to be readable and writable memories and may be memories enabling only reading as well.

Further, it is not always necessary to provide the address generators (AGW, AGR) and address selectors (AW-SEL, AR-SEL) for reading and writing. For example, when the IMs are single port memories, since the write addresses and the read addresses need not be simultaneously supplied, the write addresses and read addresses may be generated at a common address generator, and the common address selector may select the write addresses and the read addresses as well.

As the configuration information memory (CS-MEM) supplying the configuration information to the components inside the reconfigurable hardware mentioned above, use may be made of a configuration information memory having memory means connected in the form of a ring as disclosed in for example Japanese Patent Publication (A) No. 2002-215382. Due to this, it becomes possible to reconfigure the PUs inside the reconfigurable hardware and set the address generation units (AGW, AGR) and the address selection units (AW-SEL, AR-SEL) parallel to the processing and thereby shorten the processing time.

According to the memory access control device of the present invention, even with a simple configuration, free access is possible from a plurality of ports to a plurality of memories.

According to the processing system of the present invention, free access from the reconfigurable plurality of processing execution units to the plurality of memories becomes possible, therefore freer processing can be carried out without providing a processing step such as temporary transfer of the processing results to an external storage device.

LIST OF REFERENCES

10 . . . processing unit
20 . . . system memory
30 . . . reconfigurable hardware
   31-0 to 31-3 . . . local memory
   32 . . . local memory interface
   33 . . . reconfiguration unit
      33-0 to 33-3 . . . processing execution unit
   34 . . . configuration information storage unit
   35 . . . read address generation unit
      35-0 to 35-3 . . . read address generator
      36-0 to 36-3 . . . read address selector
      37-0 to 37-3 . . . read data selector
   38 . . . write address generation unit
      38-0 to 38-3 . . . write address generator
      39-0 to 39-3 . . . write address selector
      40-0 to 40-3 . . . write data selector
      41-0 to 41-3 . . . write control signal generator
PR-0 to PR-3, PW-0 to PW-3, Psys . . . ports.

The invention claimed is:

1. A memory access control device, comprising:
a plurality of memory areas associated with a plurality of address spaces whereby access to a respective one of said plurality of memory areas is controlled by specifying at least part of its associated address space;
a plurality of write ports each operable to provide respective write data;
a write data selecting block operable to select a plurality of write data paths between said plurality of write ports and said plurality of memory areas over which said plurality of write ports provide the respective write data to said plurality of memory areas;
a plurality of read ports each operable to receive respective read data;
a read data selecting block operable to select a plurality of read data paths between said plurality of memory areas and said plurality of read ports over which said plurality of read ports receive the respective read data from said plurality of memory areas; and
a control block operable to provide configuration information by which said write data selecting block selects the plurality of write data paths and by which said read data selecting block selects the plurality of read data paths, the configuration information allocating the plurality of address spaces among the plurality of write data paths such that a respective one of said plurality of memory areas receives write data only from a specific one of said plurality of write ports and allocating the plurality of address spaces among the plurality of read data paths such that a given one of said plurality of memory areas provides read data only to a particular one of said plurality of read ports, the plurality of write data paths thereby being operable in parallel and independent of each other and the plurality of read data paths thereby being operable in parallel and independent of each other without any one of said plurality of memory areas being read from and written to at the same time.

2. A memory access control device according to claim 1, wherein said control block includes a plurality of control signal generating blocks associated with said plurality of memory areas and operable to generate control signals to its associated memory area, one of the control signals enabling data to be written to the associated memory area and another of the control signals preventing data from being written to its associated memory areas.

3. A memory access control device according to claim 1, further comprising: a plurality of data computation blocks respectively associated with, and providing the respective write data to, said plurality of write ports and respectively associated with, and receiving the respective read data from, said plurality of read ports.

4. A processing system, comprising:
a memory access control device, including:
a plurality of memory areas associated with a plurality of address spaces whereby access to a respective one of said plurality of memory areas is controlled by specifying at least part of its associated address space,
a plurality of write ports each operable to provide respective write data,
a write data selecting block operable to select a plurality of write data paths between said plurality of write ports and said plurality of memory areas over which said plurality of write ports provide the respective write data to said plurality of memory areas, a plurality of read ports each operable to receive respective read data, a read data selecting block operable to select a plurality of read data paths between said plurality of memory areas and said plurality of read ports over which said plurality of read ports receive the respective read data from said plurality of memory areas, a control block operable to provide configuration information by which said write data selecting block selects the plurality of write data paths and by which said read data selecting block selects the plurality of read data paths, the configuration information allocating the plurality of address spaces among the plurality of write data paths such that a respective one of said plurality of memory areas receives write data only from a specific one of said plurality of write ports and allocating the plurality of address spaces among the plurality of read data paths such that a given one of said plurality of memory areas provides read data only to a particular one of said plurality of read ports, the plurality of write data paths thereby being operable in parallel and independent of each other and the plurality of read data paths thereby being operable in parallel and independent of each other without any one of said plurality of memory areas being read from and written to at the same time, and a plurality of data computation blocks respectively associated with, and providing the respective write data to, said plurality of write ports and respectively associated with, and receiving the respective read data from, said plurality of read ports.

5. A processing system according to claim 4, wherein said control block of said memory access control device includes a plurality of control signal generating blocks associated with said plurality of memory areas and operable to generate control signals to its associated memory area, one of the control signals enabling data to be written to the associated memory area and another of the control signals preventing data from being written to its associated memory areas.

* * * * *